Aug. 10, 1937.  W. R. FREEMAN  2,089,256
BRAKE CONTROL MECHANISM
Filed Nov. 2, 1936
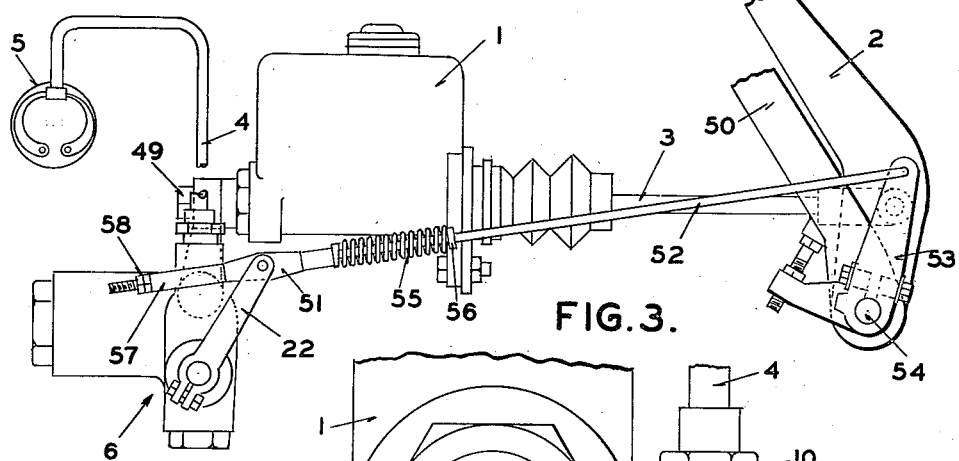
FIG. 1.
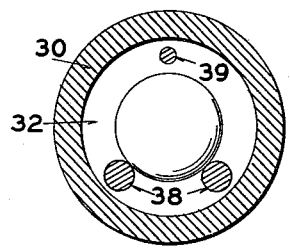
FIG. 4
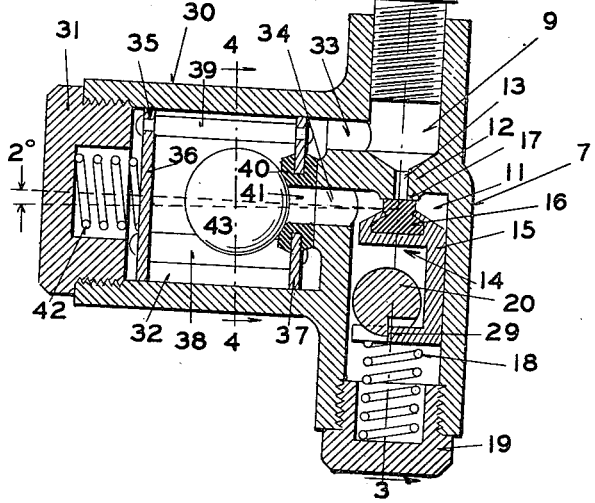
FIG. 2.
FIG. 3.
INVENTOR
WALTER R. FREEMAN
BY
ATTORNEY Patented Aug. 10, 1937

2,089,256

UNITED STATES PATENT OFFICE 2,089,256

BRAKE CONTROL MECHANISM

Walter R. Freeman, University City, Mo., assignor to Wagner Electric Corporation, St. Louis, Mo., a corporation of Delaware Application November 2, 1936, Serial No. 108,751

10 Claims. (Cl. 192—13)

My invention relates to brake control mechanism and more particularly to mechanism for holding the brakes of a vehicle in applied position when the clutch mechanism is in disengaged condition and constitutes an improvement over the mechanism shown in my Patent No. 2,030,288 issued February 11, 1936.

In this patent the holding mechanism includes a valve, one element of which is subject to the influence of gravity and of inertia. In opening the valve by engaging the clutch mechanism to thereby release the brakes from applied position, the controlled valve element must be moved off its seat against the fluid pressure in the brake system. When the valve seat is made of rubber or other slightly yieldable material it is possible that the opening of the valve against fluid pressure, especially a high fluid pressure, may cause some wear of the valve seat which would tend to shorten its life.

One of the objects of my invention is to provide, in a holding mechanism, a manually-actuated valve means for releasing the brakes which is so embodied in the holding mechanism that the unseating of the valve will be assisted by the fluid pressure being maintained in the braking system.

Another object of my invention is to so embody a release valve in a holding mechanism that it will act as a pressure limiting valve whereby the amount of fluid pressure which may be maintained in the braking system when the holding mechanism is effective can be predetermined.

Still another object of my invention is to embody a manually-operable pressure limiting valve in a by-pass of a brake holding mechanism employing a control valve subject to the influence of gravity and of inertia.

Other objects of my invention will become apparent from the following description taken in connection with the accompanying drawing in which Figure 1 is a side view of my improved brake holding mechanism as applied to a hydraulic brake system and controlled by the clutch operating mechanism; Figure 2 is a longitudinal cross-sectional view of the holding mechanism; Figure 3 is a cross-sectional view on the line 3—3 of Figure 2 showing the control shaft in a position wherein the pressure limiting valve is closed and how the mechanism is attached to the master cylinder; and Figure 4 is a cross-sectional view taken on the line 4—4 of Figure 2.

Referring to the drawing in detail, the master cylinder device 1 for the hydraulic brake system is of the usual type and embodies a cylinder and piston (not shown) whereby actuation of the brake pedal 2 and the connecting rod 3 will create a fluid pressure in the system to apply the brakes. Attached to the end of the master cylinder and interposed between it and the fluid conducting line 4 leading to the wheel brakes 5 (one only being diagrammatically illustrated) is my improved holding mechanism generally indicated by the reference character 6.

In the specific embodiment disclosed, the brake holding mechanism comprises a casing 7 having a threaded inlet opening 8 and a threaded outlet opening 9, the latter receiving the threaded fitting 10 for connection with conduit 4 leading to the brakes. The lower part of casing 7 opposite outlet 9 is provided with a chamber 11 which is separated from the outlet by a partition 12 in which there is a passage 13 whereby fluid, under certain conditions, may flow between the outlet and chamber 11. The chamber 11 has positioned therein a pressure limiting valve 14 which comprises a valve carrying member 15 in slidable engagement with the walls of the chamber and a valve element 16 formed of a suitable material as, for example, rubber. This valve element is adapted to cooperate with a valve seat 17 at the end of passage 13 and is normally biased on this seat by a coil spring 18 acting upon the other end of member 15. This coil spring abuts against a closure plug 19 for the lower end of chamber 11 and the plug, when removed, permits the insertion and removal of the spring and the valve carrying member 15. The spring 18 exerts a predetermined pressure on the valve element 16 which determines the amount of fluid pressure that may be held in the brake lines. If it is found desirable to change the spring pressure, this may be easily accomplished by inserting a disk or disks between the spring and the plug.

The portion of casing 7 forming chamber 11 has mounted therein a control shaft 20 which extends across the chamber and through the opposite ends of the valve carrying member 15. The inner end of this shaft is journaled in a suitable bore 21 in the wall of the casing and the opposite end is formed with a reduced diameter which projects to the exterior of the casing and has mounted thereon a suitable actuating lever 22. This outer end of the shaft has bearing in the casing wall by means of a packing gland 23 comprising a threaded plug 24 and a rubber sealing washer 25. In order to insure proper sealing between washer 25 and the shaft and to prevent any end play of the shaft, a spring 26 is interposed between the inner end of the shaft and the casing which biases the shaft shoulder against the washer. The central portion of the shaft is formed with a flat surface 27 which acts as a cam to actuate the valve carrying member 15 and open the valve by engaging the lower end of member 15. The central part of the shaft also is formed with a projection 28 for engagement with a stop surface 29 formed by cutting out a portion of the lower end of the valve carrying member. This construction limits the extent of rotation of the shaft in a counter-clockwise direction as viewed in Figure 2.

The forward part of casing 7 is formed with an integral cylindrical extension 30 closed at its outer end by a suitable plug 31 to thereby provide a cylindrical chamber 32. This chamber is in communication with outlet 9 by means of a passage 33 and in communication with chamber 11 by a passage 34, the latter passage being substantially axially aligned with the axis of the cylindrical extension 30.

The passage 34 is controlled by a valve which is moved to closed position by the action of gravity when the vehicle is stopped on a level or ascending grade and to open position by the action of inertia during deceleration of the vehicle. This valve comprises a cage 35 having end plates 36 and 37 connected together by two lower rods 38 and a central upper rod 39. The end plate 37 is apertured and mounted therein is a rubber valve seat 40 having an opening 41 therein. The surface of the valve seat on the side adjacent passage 34 is adapted to abut the surface surrounding said passage, being maintained in engagement therewith by a suitable spring 42 interposed between end plate 36 of the cage and closure plug 31. The inner surface of the rubber valve seat 40 is adapted to cooperate with the surface of a ball 43 mounted upon the two lower cage rods 38 and free to roll back and forth thereon, whereby, under certain conditions, it can engage the seat 40 and close passage 34 and under other conditions can be moved away from said seat to open passage 34, these conditions to be described in detail later.

The inlet opening 8 is at all times in communication with chamber 11 by means of passage 44. The inlet passage is also in constant communication with the cylinder of the master cylinder device 1 by a suitable fitting 45. Casing 7, as a whole, is attached to fitting 45 by means of a stud bolt 46 which is formed with an L-shaped passage 47 providing communication between passage 48 in fitting 45 and inlet 8 of casing 7. A stud bolt 49, similar to stud bolt 46, is also employed to secure fitting 45 to the outlet of the master cylinder and to provide communication between the cylinder and passage 48 in the fitting. It is to be noted that fitting 45 is so formed that the attaching bolts 46 and 49 are at right angles to each other, thus permitting casing 7 to be adjusted in two vertical planes each at right angles to the other.

The control shaft 20 for the pressure limiting valve member 15 is adapted to be controlled by the clutch pedal 50 of the vehicle. The upper end of lever 22, which is attached to the outer end of shaft 20, has pivoted thereto a member 51 which slidably receives a rod 52 connected to clutch pedal 50 by means of a separate arm 53 secured to the clutch shaft 54. The pivoted member 51 is connected to rod 52 through a spring 55, one end of the spring engaging member 51 and the other engaging a stop 56 on the rod. The rod 52 is also provided with a sleeve 57 adjustably mounted on the end of the rod by nuts 58 in order to produce a positive connection between the rod and member 51 when the rod is moved to the right as viewed in Figure 1.

In mounting casing 7 on the master cylinder 5 by means of fitting 45, casing 7 is so positioned that rods 38, forming the track upon which ball 43 rolls, will be at an angle of approximately two degrees to the plane of the support of the vehicle, such angle being indicated in Figure 2. It is to be understood that, although two degrees is indicated as a preferable angle, the angle may be varied within certain limits. When the casing is positioned in the manner indicated, ball 43 will always seat against valve seat 40 whenever the vehicle is stopped on either a level or ascending roadway, thus closing passage 34 between the cylindrical chamber 32 and chamber 11. The angle is also such that it will not prevent the ball from rolling forward off seat 40 by the action of inertia when the vehicle is decelerating either as a result of the braking effect of the engine or the wheel brakes, or both.

Referring to the operation of the above described mechanism, it is first assumed that the vehicle is stopped on either a level or ascending roadway and under these conditions and due to the angular seating of the mechanism, ball 43 will engage the rubber seat 40 and close passage 34. If the clutch is disengaged by depressing clutch pedal 50, the actuating lever 22 for the valve control shaft 20 will be moved forwardly and the shaft will assume the position indicated in Figure 3. The pressure limiting valve will now be permitted to be closed and held closed by the action of spring 18. Since both passages 34 and 13 are now closed, then if the brakes have already been applied by actuation of the master cylinder device 1, fluid will be trapped in the brake system and the brakes will be held applied. If the brakes have been applied with an excessive amount of pressure which is above that predetermined by the pressure limiting valve 14, the excessive pressure can flow back into the master cylinder by unseating the valve. The spring 18 of the valve should be such that the valve will maintain sufficient pressure in the braking system so as to hold the brakes applied and keep the vehicle from rolling backward on any grade which may be encountered in driving the vehicle. Under ordinary conditions this pressure would be around four or five hundred pounds per square inch but it is to be understood that if the conditions require, the valve may be properly set in the manner already indicated to maintain a larger or a smaller pressure in the brake system.

When the vehicle has been stopped in the manner referred to and the clutch pedal is depressed to disengage the clutch prior to application of the brakes then, although the pressure limiting valve 14 is permitted to become seated and ball 43 has also become seated against its seat 40, the brakes can be applied by actuation of the master cylinder device. When the brake pedal is actuated fluid is free to flow through passage 48 of fitting 45, inlet 8, passage 44, chamber 11 and passage 34 into chamber 32 by temporarily unseating ball 43 from its seat 40. After fluid enters chamber 32, it is free to flow through passage 33 to outlet 9 and into the brake system through conduit 4. If the application of the brakes by the brake pedal produces a pressure in the system greater than that for which the pressure limiting valve is set, the excess pressure will be relieved as soon as brake pedal 2 is released to return the master cylinder piston to its retracted position.

With the clutch disengaged and the brakes held in applied position by the brake holding mechanism, the operator of the vehicle does not need to hold his foot upon the brake pedal and, as a result thereof, he is free to place it on any other operating instrument of the vehicle which, for example, may be either the starter button or the accelerator pedal. When the operator is ready to start the vehicle again, he need only speed up the engine by moving the accelerator with his right foot and there will be no danger, in the meantime, of the vehicle rolling back and hitting a vehicle directly behind it or so rolling back that an excessive load is placed upon the engine and thereby causing it to stop. As soon as the clutch pedal is released, lever 22 will be returned to the position indicated in Figure 1 and under these conditions the control shaft 20 will be rotated so that surface 27 will engage the lower part of the valve carrying member 15 of the pressure limiting valve and thereby unseat valve element 16 from its seat 17 and against the action of spring 18. As soon as the valve is unseated, fluid may flow from the brake system back to the master cylinder device to release the brakes, the path of flow under these conditions being from outlet 9 through passage 13, chamber 11, passage 44 and inlet 8 and then back into the master cylinder device through passage 44 in the connecting fitting 45.

When the vehicle is traveling in a forward direction it is desirable to have the brake holding means ineffective and the brakes solely under control of the brake pedal regardless of whether the clutch mechanism is engaged or disengaged. The holding mechanism permits this desirable operation for as soon as the brakes are applied with the vehicle moving forward, the vehicle immediately begins to decelerate and, since ball 43 may freely roll on its track, its inertia, due to the deceleration of the vehicle, will cause the ball to move to the left and away from valve seat 40 as viewed in Figure 2. With the ball thus unseated fluid may freely flow back and forth through passage 34, thus permitting the brakes to be applied and released as desired by proper control of brake pedal 2. The condition of the pressure limiting valve 14 under these conditions is of no consequence as it may be closed as a result of disengagement of the clutch or opened as a result of the clutch being engaged. As soon as the vehicle comes to a stop on either a level or ascending roadway, the action of inertia will become ineffective and the ball will again move to the right and assume its position upon seat 40 due to the action of gravity.

When the vehicle is on a descending roadway it is not necessary to have any means for preventing release of the brakes for in that event no problem is present in the manipulation of the clutch, brake pedal and throttle to start the vehicle for all that is necessary is to hold the brakes applied by the brake pedal and when the operator is ready to start, he need only remove his foot from the latter and the vehicle will move in the direction desired. When the vehicle is on a descending roadway which is greater than two degrees, ball 43 will roll to the left and away from seat 40, thus permitting the brakes to be applied and released notwithstanding the condition of the clutch pedal.

The connection between the actuating lever 22 and the clutch pedal is such that the extent of throw of the clutch pedal will have no effect upon the mechanism due to spring 55 for when the clutch is moved to a position where the shaft is rotated sufficiently to bring projection 28 against the stop surface 29 and prevent further rotation of the shaft, spring 55 can be compressed and permit additional travel of the clutch pedal. Due to the positive connection afforded by sleeve 57 between lever 22 and the connecting rod 52, the pressure limiting valve can always be unseated at the proper time during the return movement of the clutch pedal to reengage the clutch. By properly adjusting nuts 58, the valve may be unseated just prior to or simultaneously with the first contact of the clutch plates of the clutch.

From the foregoing description of my improved control mechanism it is readily seen that it is not necessary to unseat ball 43 to release the brakes by the clutch mechanism as this function is performed by opening the pressure limiting valve. With the structure described there is no unnecessary wear on the rubber valve seat 40 which would be present if the ball were manually pulled off seat 40 or the cage moved as a whole to unseat seat 40 from the surface surrounding passage 34. The arrangement of the pressure limiting valve is also such that when it is unseated to release the brakes the unseating is assisted by the pressure which is maintained in the brake system and, therefore, the valve can be unseated with very little effort and without any strain on the rubber valve element 16 when it is pulled off its seat, thus eliminating the possibility of this valve element becoming worn. By employing a pressure limiting valve in a by-pass around the main gravity and inertia control valve, there is no danger of excessive pressure in the brake system when such pressures are not desired, thus eliminating any injurious effects to the flexible hose and the rubber packing cups which are employed as a part of the brake system.

Having fully described my invention, what I claim as new and desire to secure by Letters Patent of the United States is:

1. In a motor vehicle provided with fluid-operated brakes, the combination with a conduit for conveying fluid under pressure from a source of pressure to the brake unit, a pressure limiting valve in said conduit comprising a valve element movable off its seat in the direction of fluid flow back from the brake unit and a spring for biasing the valve element on its seat to thereby maintain a predetermined fluid pressure in the brake unit, a manually-controlled member for positively moving said valve element off its seat in conjunction with the assistance of the pressure of the fluid maintained in the brake unit and against the action of the spring and for normally holding said valve element unseated, means forming a by-pass around said pressure limiting valve, and a check valve in said by-pass permitting fluid to flow from the source of pressure to the brake unit.

2. In a motor vehicle provided with a clutch mechanism and with fluid-operated brakes, the combination with a conduit for conveying fluid under pressure from a source of pressure to the brake unit, a pressure limiting valve in said conduit comprising a valve element movable off its seat in a direction away from the brake unit and a spring for biasing the valve element on its seat to thereby maintain a predetermined fluid pressure in the brake unit, a member connected to the clutch control mechanism for positively moving said valve element off its seat in conjunction with the assistance of the pressure of the fluid maintained in the brake unit and against the action of the spring and for normally holding said valve element unseated when the clutch control mechanism is in clutch disengaged position, means forming a by-pass around said pressure limiting valve, and a check valve in said by-pass permitting fluid to flow from the source of pressure to the brake unit.

3. In a motor vehicle provided with a fluid-actuated brake system, valve means for preventing release of the brakes from applied position, said valve means adapted to be moved to valve closed position by the action of gravity and to valve open position by the action of inertia during deceleration of the vehicle, a by-pass around said valve, and a pressure relief valve in said by-pass for limiting the amount of fluid pressure that can be maintained in said brake system.

4. In a motor vehicle provided with a fluid-actuated brake system, valve mean for preventing release of the brakes from applied position, said valve means adapted to be moved to valve closed position by the action of gravity and to valve open position by the action of inertia during deceleration of the vehicle, a by-pass around said valve, a pressure relief valve in said by-pass for limiting the amount of fluid pressure that can be maintained in said brake system, and manual means for disabling said pressure relief valve.

5. In a motor vehicle provided with a fluid-actuated brake system and a clutch mechanism, valve means for preventing release of the brakes from applied position, said valve means adapted to be moved to valve closed position by the action of gravity and to valve open position by the action of inertia during deceleration of the vehicle, a by-pass around said valve, a pressure relief valve in said by-pass for limiting the amount of fluid pressure that can be maintained in said brake system, and means for disabling said pressure relief valve when the clutch mechanism is in clutch-engaged position.

6. In a motor vehicle provided with brakes, means for applying the brakes, means for preventing release of the brakes from applied position notwithstanding the applying means permits release thereof, said release preventing means comprising two independently operable valves, one of said valves being controlled by gravity and inertia during the deceleration of the vehicle and the other of said valves being a pressure limiting valve, and manual means for positively unseating said pressure limiting valve.

7. In a motor vehicle provided with brakes, means for applying the brakes and a clutch mechanism, means for preventing release of the brakes from applied position notwithstanding the applying means permits release thereof, said release preventing means comprising two independently operable valves, one of said valves being moved to open position by the action of inertia during deceleration of the vehicle and to closed position by the action of gravity when the vehicle is stopped, the other of said valves being a pressure limiting valve for predetermining the amount of fluid pressure which may be maintained in the braking system, and means for opening said pressure limiting valve when the clutch mechanism is in engaged position.

8. In a motor vehicle provided with a fluid-actuated brake system, valve means for preventing release of the brakes from applied position, said valve means adapted to be moved to valve closed position by the action of gravity and to valve open position by the action of inertia during deceleration of the vehicle, a by-pass around said valve, a spring-biased valve for controlling said by-pass and adapted to be unseated by the pressure in the brake operating portion of the braking system when such pressure exceeds a predetermined value, a rotatable shaft, cooperating means between said shaft and the spring-biased valve and operable by rotation of said shaft for holding said valve off its seat, and manual means for rotating said shaft.

9. In a motor vehicle provided with fluid-operated brakes, the combination with a conduit for conveying fluid under pressure from the source of pressure to the brake unit, a casing interposed in said conduit and provided with two separate passageways between the source of pressure and the brake unit, a combined gravity and inertia controlled valve for controlling one of said passageways, a spring-biased pressure limiting valve for controlling the other passageway and adapted to be unseated by a predetermined pressure in the conduit leading from the casing to the brake unit, a manually rotatable shaft carried by the casing, cam means operable by the rotation of the shaft for unseating the pressure limiting valve and holding it in an unseated position, and stop means for limiting the rotation of the shaft in a direction opposite to the direction of rotation necessary to unseat said valve.

10. In a motor vehicle provided with fluid-actuated brakes, valve means for preventing release of the brakes from applied position comprising a casing forming a chamber and having a passage at one end thereof, a cage in said chamber including an apertured end plate and a pair of rods forming a track, a ball on said track, an annular valve seat positioned in the aperture of said end plate and having one surface cooperating with the surface surrounding the passage at the end of the chamber and its other surface cooperating with the ball, and means for holding the valve seat against the end of the chamber.

WALTER R. FREEMAN.